(12) United States Patent
Obediente et al.

(10) Patent No.: US 11,863,450 B1
(45) Date of Patent: Jan. 2, 2024

(54) METHOD USING NETWORK CONTROLLER TO DEPLOY VIRTUAL ENVIRONMENT IN PRODUCTION NETWORK

(71) Applicant: Cisco Technology, Inc., San Jose, CA (US)

(72) Inventors: Cesar Obediente, Apex, NC (US); Craig Thomas Hill, Sterling, VA (US); Nagendra Kumar Nainar, Morrisville, NC (US); David John Zacks, Vancouver (CA); Jaganbabu Rajamanickam, Kanata (CA); Madhan Sankaranarayanan, Tamil Nadu (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/063,291

(22) Filed: Dec. 8, 2022

(51) Int. Cl.
*H04L 45/76* (2022.01)

(52) U.S. Cl.
CPC ..................... *H04L 45/76* (2022.05)

(58) Field of Classification Search
CPC ....................................................... H04L 45/76
See application file for complete search history.

(56) References Cited

U.S. PATENT DOCUMENTS

| 9,697,172 | B1 * | 7/2017 | Somohano | ............ | H04L 41/122 |
| 10,462,009 | B1 | 10/2019 | Shiramshetti | | |
| 10,819,618 | B1 * | 10/2020 | Wada | ...................... | H04L 43/50 |
| 11,190,266 | B1 * | 11/2021 | Black | .................. | H04L 63/0823 |
| 11,228,645 | B2 | 1/2022 | Mukhopadhyay et al. | | |
| 11,627,011 | B1 * | 4/2023 | Callender | ......... | G06F 16/90335 |
| | | | | | 709/223 |
| 2016/0057102 | A1 | 2/2016 | Wei et al. | | |
| 2017/0006083 | A1 | 1/2017 | McDonnell | | |
| 2017/0155680 | A1 | 6/2017 | Wackerly | | |

(Continued)

FOREIGN PATENT DOCUMENTS

EP        2849064 A1     3/2015

OTHER PUBLICATIONS

ONAP, "ONAP VoLTE Use Case Blueprint Overview," https://www.onap.org/wp-content/uploads/sites/20/2018/06/ONAP_CaseSolution_VoLTE_0618FNL.pdf, Jun. 2018, 9 pages.

(Continued)

*Primary Examiner* — Hua Fan
(74) *Attorney, Agent, or Firm* — Edell, Shapiro & Finnan, LLC (57) ABSTRACT

A method comprises: at a network device configured to be connected to a network and having control and data planes, and interfaces configured for network operations in the network: upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

20 Claims, 7 Drawing Sheets

(56) References Cited

U.S. PATENT DOCUMENTS

| | | | |
|---|---|---|---|
| 2018/0026848 A9* | 1/2018 | Dagan | H04L 41/122 709/224 |
| 2018/0121227 A1 | 5/2018 | Peng et al. | |
| 2018/0183855 A1 | 6/2018 | Sabella et al. | |
| 2018/0205637 A1 | 7/2018 | Li | |
| 2018/0375726 A1 | 12/2018 | Xia | |
| 2019/0050248 A1 | 2/2019 | Oohira et al. | |
| 2019/0089780 A1 | 3/2019 | Yousaf et al. | |
| 2019/0140921 A1 | 5/2019 | Xu et al. | |
| 2020/0249663 A1* | 8/2020 | Liu | G05B 19/41885 |
| 2020/0412596 A1 | 12/2020 | Cherunni | |
| 2021/0218798 A1 | 7/2021 | Jethanandani et al. | |
| 2022/0037111 A1* | 2/2022 | Kaplenko | H01J 37/265 |
| 2022/0231904 A1* | 7/2022 | Di Martino | H04L 43/50 |

OTHER PUBLICATIONS

ONAP, "ONAP 5G Blueprint Overview," https://www.onap.org/wp-content/uploads/sites/20/2018/11/ONAP_CaseSolution_5G_112118FNL.pdf, Nov. 2018, 10 pages.

OPNFV, "POD Descriptor," https://wiki.opnfv.org/display/INF/POD+Descriptor, Mar. 2018, 2 pages.

OPNFV, "POD Descriptor File 1.0," PowerPoint Presentation, https://wiki.opnfv.org > download >OPNFV_PDF_v1.0_28_Feb_2018.pptx, Feb. 2018, 12 pages.

Confluence, "Service Design & Creation," May 2017, 6 pages.

ETSI, "Network Functions Virtualisation (NFV) Release 2; Protocols and Data Models; VNF Package specification," Group Specification, ETSI GS NFV-SOL 004 V2.5.1, Sep. 2018, 21 pages.

ETSI, "Network Functions Virtualisation (NFV) Release 2; Protocols and Data Models; NFV descriptors based on TOSCA specification," Group Specification, ETSI GS NFV-SOL 001 V2.5.1, Dec. 2018, 205 pages.

ETSI, "Network Functions Virtualisation (NFV); Management and Orchestration," Group Specification, ETSI GS NFV-MAN 001 V1.1.1, Dec. 2014, 184 pages.

Poltronieri, et al., "ChaosTwin: A Chaos Engineering and Digital Twin Approach for the Design of Resilient IT Services," Conference Paper, 2021 17th International Conference on Network and Service Management (CNSM), Oct. 2021, 6 pages.

Eckhart, et al., "A Specification-based State Replication Approach for Digital Twins," CPS-SPC '18: Proceedings of the 2018 Workshop on Cyber-Physical Systems Security and Privacy, Oct. 2018, 12 pages.

Gavin, "Digital Twins Calibrated with Operational Data Drive Efficiency," https://www.automation.com/en-us/articles/January-2022/digital-twins-calibrated-operational-data-drive, Jan. 2022, 3 pages.

Cisco, "Using Docker with Cisco NX-OS," Cisco Nexus 9000 Series NX-OS Programmability Guide, Release 9.3(x), Oct. 2022, 16 pages.

* cited by examiner

METHOD USING NETWORK CONTROLLER TO DEPLOY VIRTUAL ENVIRONMENT IN PRODUCTION NETWORK

TECHNICAL FIELD

Background

Network providers face constant pressure to maintain stable production networks for network customers while providing new and upgraded features to enhance application performance in the production networks. Equally important is the ability of network operators to test network failure scenarios associated with the production networks to better understand the resiliency of network applications running on the production networks and how the network applications will behave in such network failure scenarios. Some network providers run network failure scenarios on simplistic network simulators or models. Such simplistic modeling fails to cover the entire scope of the production network or accurately replicate production network conditions, including those of physical components such as routers/switches, memory, central processing units (CPUs), network links, routing protocols, interface counters, and the like.

DETAILED DESCRIPTION

Overview

In an embodiment, a method comprises: at a network device configured to be connected to a network and having control and data planes, and interfaces configured for network operations in the network: upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

Example Embodiments

Networks today are complex and dispersed given the explosion of co-location facilities, and cloud and 5G environments, for example. At the same time, the networks provide critical support to and maintain a wide variety of applications operated by enterprises. Network architecture development and operational support teams seek new and innovative methods for developing and testing the networks to assure they provide high availability for all functions and/or locations of the networks. Furthermore, a test network used as a proxy to test a network is preferably an "exact-as-possible" replica of the network to assure that testing and compliance are closely aligned in any test simulation. Accordingly, embodiments presented herein accurately replicate a network (also referred to as a "production" network) to produce a test or "replica" network, and inject failures into the replica network in a secure manner to determine how the network will react to the failures. The replica network provides the same capabilities as the network. The failures are injected into the replica network, which responds to the injected failures, in a way that does not interfere with operation of the network.

Figure 1:
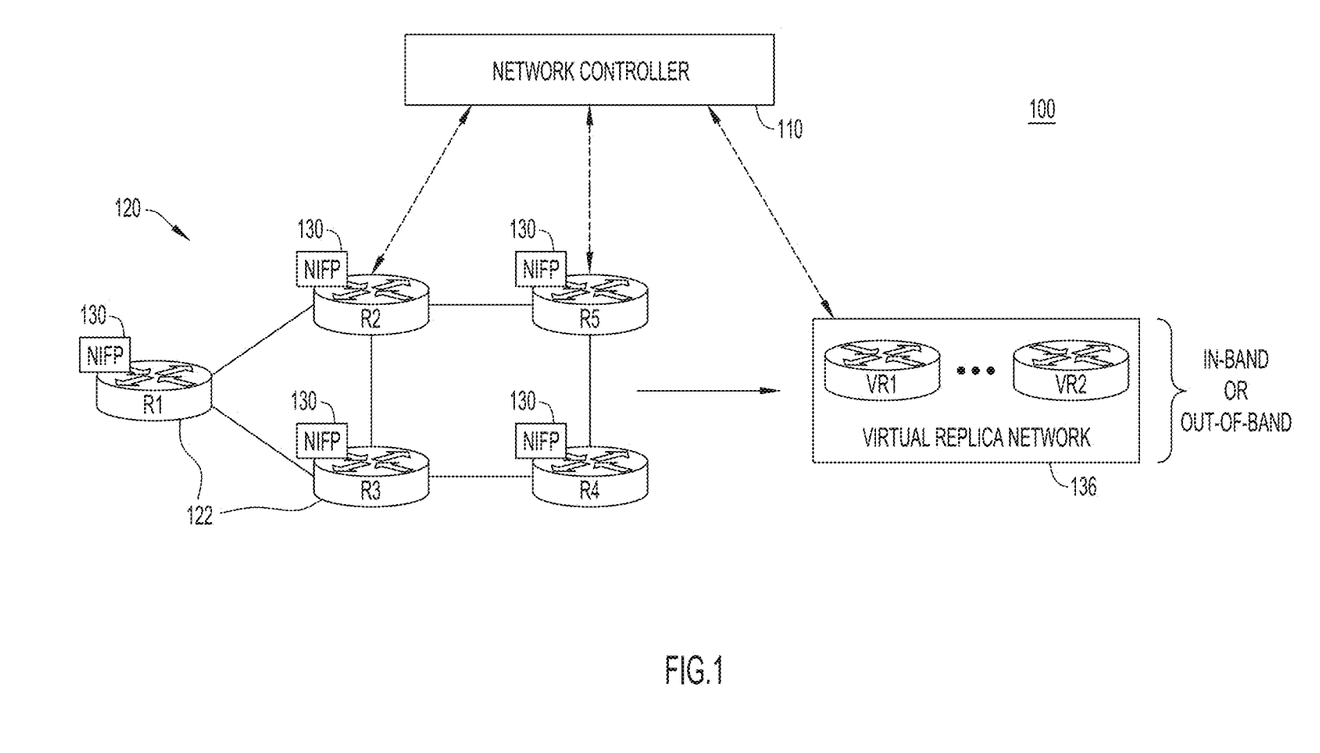
FIG. 1 is a block diagram of a system configured to deploy a virtual replica network that replicates a network, according to an example embodiment.

Reference is now made to FIG. 1, which shows a system 100 configured to deploy a virtual network environment that "virtually" replicates a network 120. System 100 includes a network controller 110 that configures and controls a plurality of network devices 122 (e.g., routers) of network 120. More generally, any controller or management entity may be used to control network devices 122 according to the embodiments presented herein. In the example shown in FIG. 1, network devices 122 include routers R1, R2, R3, R4, and R5 connected to one another over physical links or connections to form a network topology. More or fewer network devices may be employed in other examples. Each network device Ri respectively includes a management plane, a control plane, a data plane, and interfaces connected to the physical links, as is known. In the ensuing description, the management plane and the control plane are collectively, and more generally, referred to simply as the "control plane." The control and data planes of network devices 122 are configured to forward traffic (e.g., data packets) over the interfaces to and from user devices (not shown) connected to network 120. Network 120 may be referred to as a "production" network 120, and network devices 122 may be referred to as "production" network devices 122. The term "production" means that the network/network devices are deployed or fielded and perform normal/regular network operations such as routing and traffic forwarding to and from customers.

In the example of FIG. 1, a multi-role network injection failure probe (NIFP) 130 (referred to individually as NIFP 130 and collectively as NIFPs 130) is embedded in each network device Ri in the network 120. NIFPs 130 may be embodied as software agents (each referred to as a probe process) and are configured to communicate with the network controller 110. In some embodiments, network controller 110 sends commands to NIFPs 130 to control the NIFPs to create a virtual replica network 136 (also referred to as a virtual "test network") for network test purposes, which replicates the configuration, topology, and operation of part or all of network 120. As described below, virtual replica network 136 includes or instantiates one or more virtual replica network devices VR1, VR2, and so on, that replicate (virtually) corresponding ones of network devices R1, R2, and so on, and their interconnections.

In some embodiments, network controller 110 may control NIFPs 130 to introduce virtual or synthetic network failure tasks or scenarios into virtual replica network 136. The network failure tasks or scenarios may include different types of network failures such as link failure, link load, etc. After completion of a failure scenario, the NIFPs 130 may report back to network controller 110, which may communicate with a network operations team (not shown) to understand and comprehend the potential impact of the failures. In an example, the network controller 110 and the NIFPs 130 may be configured to use in-Situ Operations Administration and Maintenance (iOAM) techniques to propagate relevant network failure information as these induced failures/errors occur.

Embodiments presented herein include an out-of-band option and an in-band option for virtual replica network 136. In the out-of-band option, virtual replica network 136 is physically separate from network devices 122. That is, virtual replica network 136 is hosted in a network test environment that does not reside on network devices 122. On the other hand, in the in-band option, virtual replica network 136 resides on one or more of network devices 122. In both cases, virtual replica network 136 virtually replicates the control planes (including the management planes), data planes, and interfaces of one or more of network devices 122, and thereby accurately replicates at least a portion of the topology of network 120. Thus, virtual replica network 136 may include virtual control planes, virtual data planes, and virtual interfaces that replicate the control planes, data planes, and interfaces of network devices 122.

Figure 2:
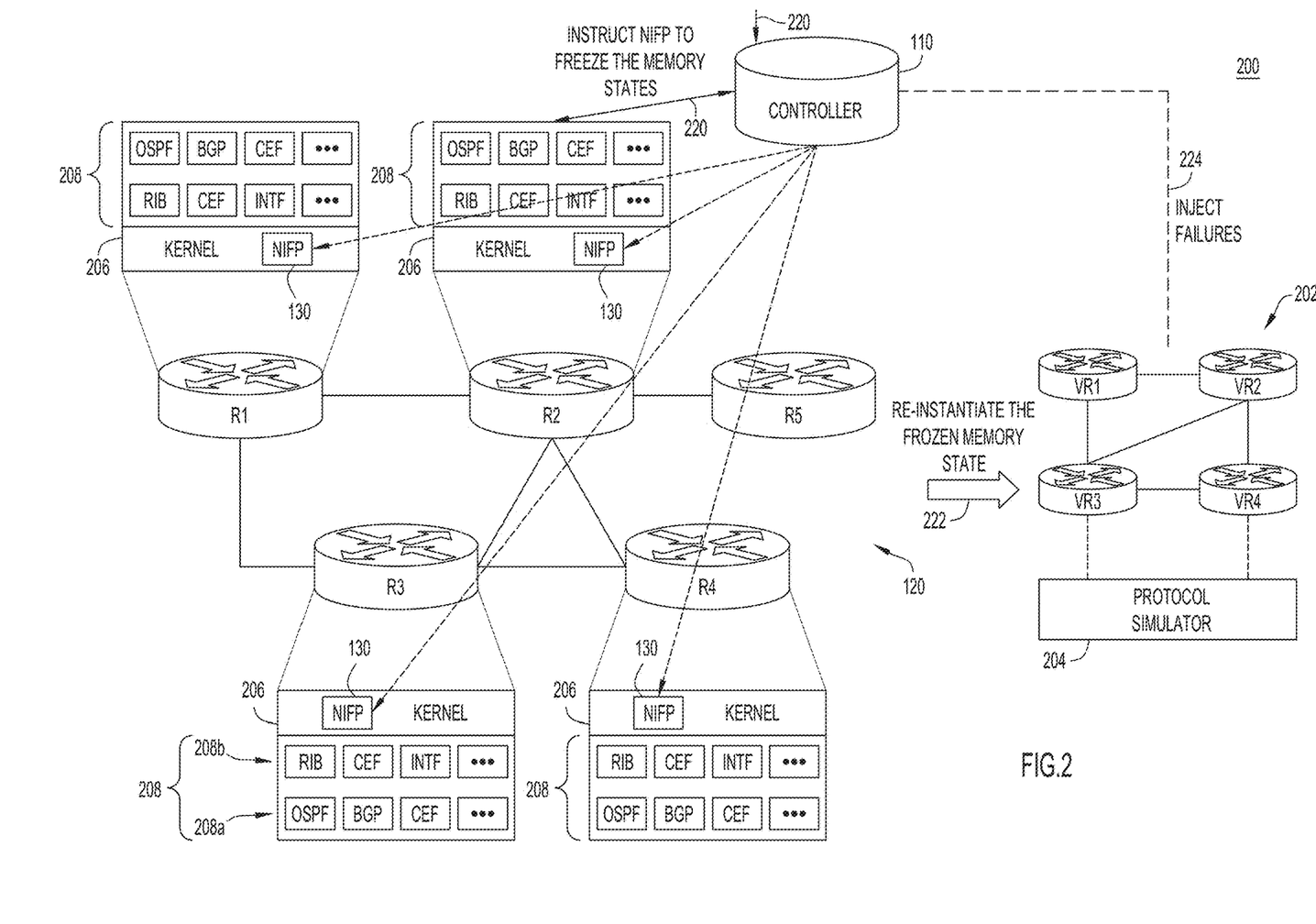
FIG. 2 is an illustration of an out-of-band option for creating the virtual replica network so that it is physically separate from the network, according to an example embodiment.

FIG. 2 is an illustration of an example out-of-band method 200 of creating a virtual replica network 202 (representative of virtual replica network 136 in FIG. 1) in an external virtual environment, such as on a protocol simulator 204, that is physically separate from (i.e., external to) network devices 122 and thus physically separate from network 120. In the example of FIG. 2, virtual replica network 202 includes virtual replica network devices VR1, VR2, VR3, and VR4 hosted/instantiated on protocol simulator 204, and which virtually replicate network devices R1, R2, R3, and R4, respectively.

Out-of-band method 200 employs NIFPs 130 to replicate the "content" of one or more of network devices 122 (e.g., network devices R1-R4) to protocol simulator 204. Particularly, NIFPs 130 freeze the configurations and memory states of the one or more of network devices and take an exact "snapshot in time" (referred to simply as a "snapshot") of the (frozen) configurations and memory states of the one or more network devices at the time the snapshot is taken. The snapshot includes management plane, control plane, and data plane state entries, counter and registry information, and interface details, of the one or more network devices, which may be used to fully replicate, or only partially replicate, the network.

For example, the snapshot may include routing and forwarding tables, interface register states and counters, and so on. Multiple snapshots may be used to instantiate virtual replica network 202. Then, operators may introduce virtual failure scenarios into virtual replica network 202 safely, outside of network 120.

In the example of FIG. 2, each network device Ri respectively includes a kernel 206 (e.g., a Linux kernel), NIFP 130 hosted on the kernel, and network components 208 that are also hosted on the kernel. Network components 208 collectively implement or represent a control plane, a data plane, and interface configuration (Intf) of network device Ri in order to route/forward traffic according to the topology of network 120. Network components 208 may be implemented in hardware and/or as applications/processes. Network components 208 include routing protocols 208a that execute on kernel 206, and configuration information 208b (including data plane information) for/associated with the routing protocols and interfaces. Routing protocols 208a may include an open shortest path first (OSPF) protocol, a border gateway protocol (BGP), and a Cisco express forwarding (CEF) switching process, for example. Other protocols may be used. Configuration information 208b may include a routing information base (RIB), a forwarding information base (FIB), and configuration information and counters (and registers) for the interfaces, for example.

Out-of-band method 200 starts at 220, when an operator sends a query to network controller 110 to initialize a test failure scenario to be run. The operator may do this via application program interfaces (APIs) to network controller 110. Network controller 110 analyzes the query from the operator to determine or identify a list of network devices 122 (referred to as the "identified network devices") that will be part of the test failure scenario. In the example of FIG. 2, the identified network devices include network devices R1-R4. Network controller 110 communicates only with the NIFPs 130 of the identified network devices. Specifically, network controller 110 queries NIFPs 130 of the identified network devices to freeze, and then take snapshots of, full device configurations and memory states of the identified network devices. Responsive to the queries, NIFPs 130 on the identified network devices capture the full device configurations and memory states of the identified network devices to produce "memory snapshot" files (also referred to as device "core" files) for the identified network devices. NIFPs 130 send the memory snapshot files to network controller 110.

At 222, network controller 110 transfers the memory snapshot files to protocol simulator 204 to instantiate on the protocol simulator one or more virtual replica network devices (e.g., virtual replica network devices VR1-VR4) that virtually replicate the identified network devices (e.g., routers R1-R4) and collectively comprise or form virtual replica network 202. To do this, for example, protocol simulator 204 re-instantiates the full device configuration and memory states from the memory snapshot files to virtual replicate network devices VR1-VR4 of virtual replica network 202.

Once virtual replica network 202 has been instantiated, at 224, network controller 110 performs virtual failure injection into the virtual replica network 202 on protocol simulator 204.

Figure 3:
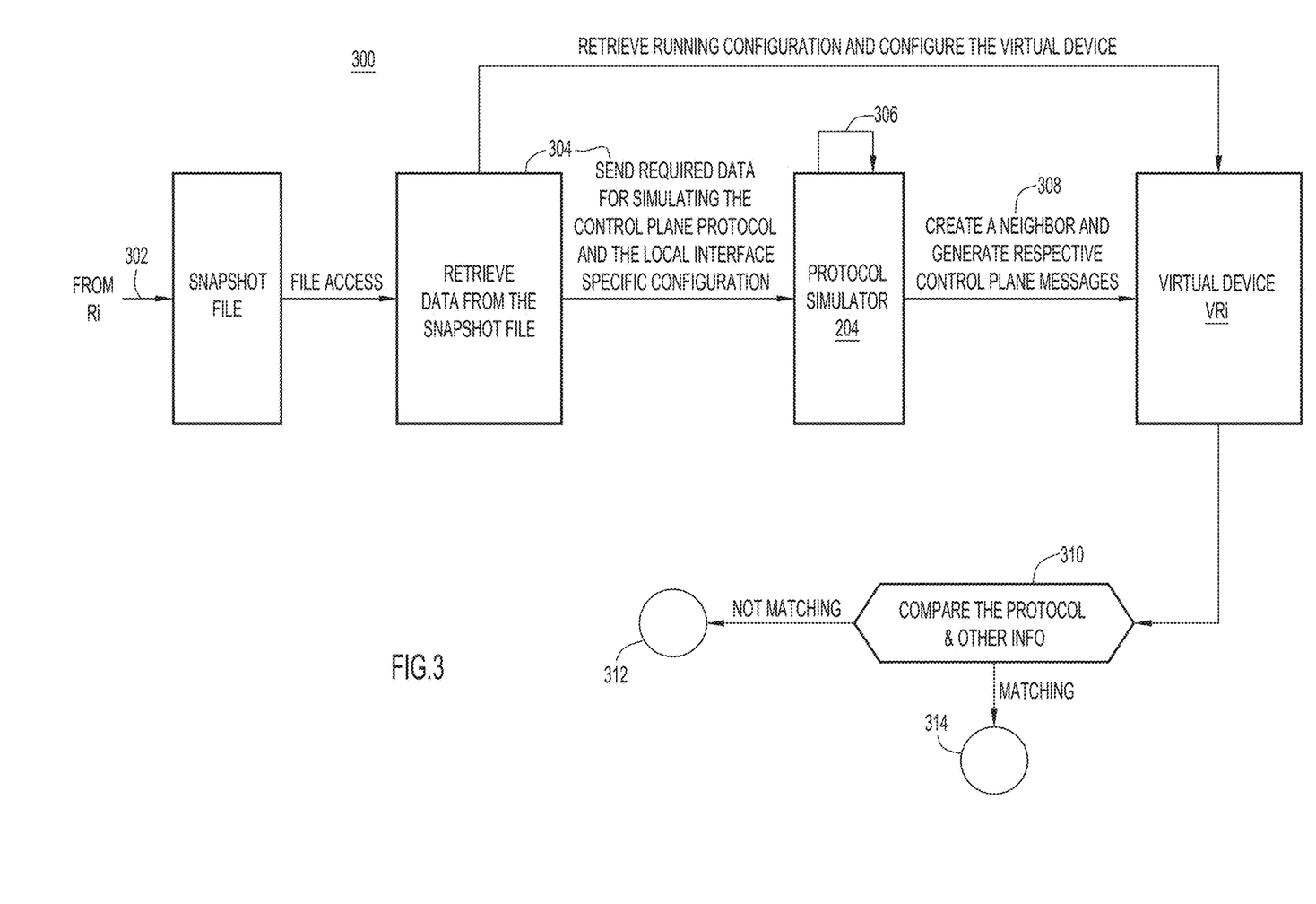
FIG. 3 shows operations employed to instantiate an external virtual network device that replicates a network device of the network using a memory snapshot taken from the network device, according to an example embodiment.

FIG. 3 shows operations 300 employed to instantiate virtual replica network device VRi that virtually replicates network device Ri using the memory snapshot file taken from the network device.

At 302, network controller 110 receives the memory snapshot file from/for the network device Ri. The memory snapshot file may be formatted in accordance with an internetwork operating system (IOS) that is running on network device Ri.

At 304, network controller 110 extracts information for network device Ri from the memory snapshot file, including configuration, protocol, and any other relevant information to be used to virtually replicate the network device. Network controller 110 sends the information to protocol simulator 204.

At 306, protocol simulator 204 simulates control plane protocols, a data plane, and local interface specific configuration of network device Ri based on the information from network controller 110, to instantiate virtual replica network device VRi.

At 308, protocol simulator 204 uses neighbor interface and protocol information for network devices that are neighbors to network device Ri as provided in the memory snapshot file to simulate the neighbors as virtual neighbors of virtual replica network device VRi.

At 310, network controller 110 compares network routes and other network-related information present in the memory snapshot file with the virtual replica network device VRi to ensure that the virtual replica network device accurately replicates, i.e., matches, the network device Ri. When there is a mismatch, at 312, adjustments are made to attain closer alignment. When there is a match, at 314, no action is taken. Next, network controller 110 injects virtual/simulated faults into the virtual replica network device VRi in accordance with at test scenario.

As described above, the out-of-band option uses the memory snapshots to simulate one or more network devices and their surrounding neighbors, which brings the virtual replica network and its virtual replica network devices as close as possible to the network and its network devices. An advantage of this approach is that, for each network device, the network device state is "snapshotted" at a given moment in time and contains all of the information configured on the network device at that time and that can be used to virtualize the network device.

The out-of-band option includes security measures to secure or protect communication between network controller 110 and network devices 122, and to secure content on and operations performed by the network devices. For example, multiple levels of transport authentication and authorization may be applied to securing the request for and retrieval of snapshots with respect to NIFPs 130. While the transport security is highly secure when strong encryption is used, API keys, and other forms of security, may be added. For example, hardware identity and software posture attestation and appraisal may also be applied, and any transfer of a snapshot item may require a full cross-check of attestation for hardware, software, software images, and tampering.

The in-band option is described below in connection with FIGS. 4-6.

At a high-level, the in-band option creates a virtual replica network that virtually replicates, and is physically implemented on, network 120. The virtual replica network comprises virtual replica network devices referred to as "local twins" implemented on, and that virtually replicate, corresponding ones of network devices 122. Although the local twins are implemented on corresponding ones of the network devices 122, the local twins operate as a virtual test environment separately or independently from their hosting network devices with respect to "production" network operation, such as production routing and traffic forwarding, and so on. The virtual replica network comprising the local twins represents a virtual replica network overlay hosted on, but that operates independently of, the underlying network (i.e., network 120).

Figure 4:
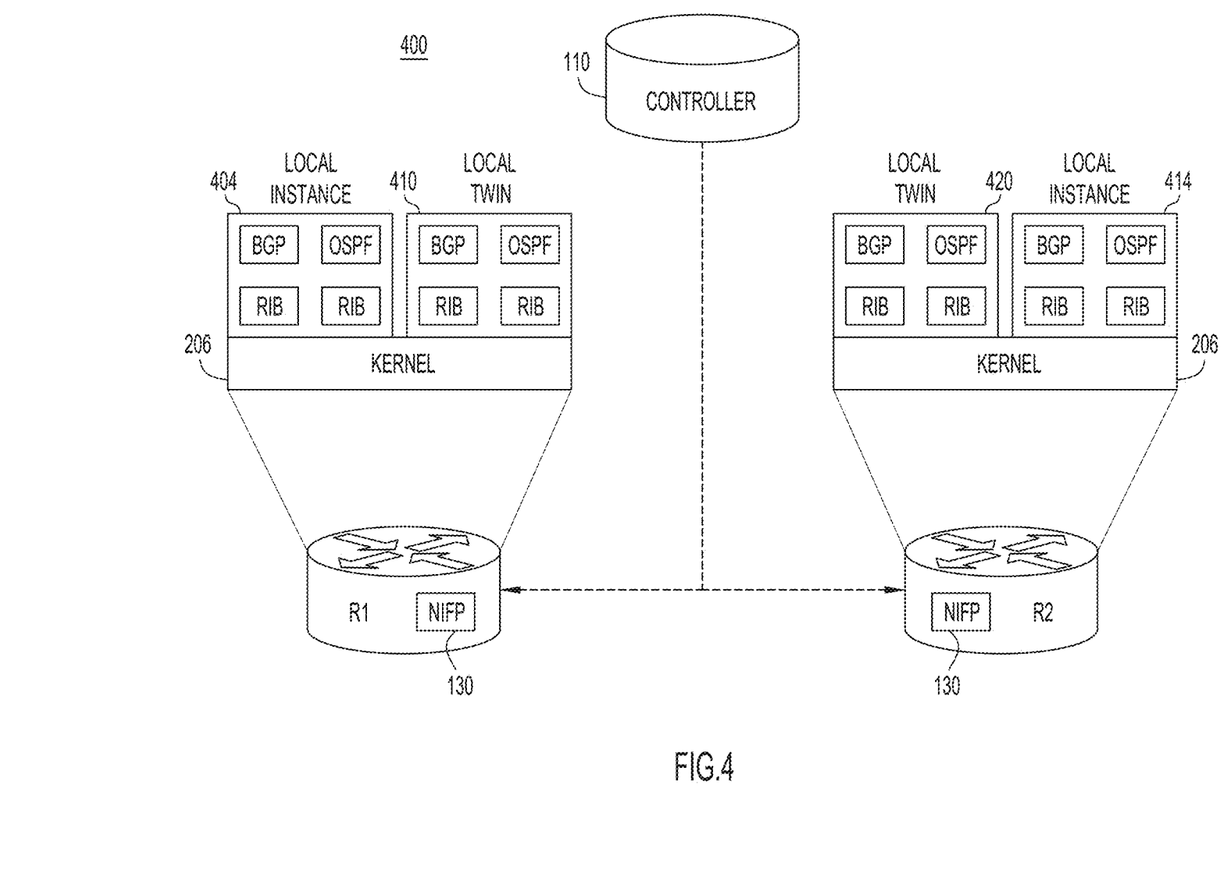
FIG. 4 is an illustration of an in-band option that includes "local twins" or virtual replica network devices that are implemented physically on network devices of the network, according to an example embodiment.

FIG. 4 is an illustration of an example in-band option 400 that includes local twins that are implemented physically on network devices R1 and R2 under control of network controller 110. Each network device Ri includes kernel 206 and NIFP 130 hosted on the kernel. Kernel 206 may include a virtualized operating system, such as the Cisco vIOS-XR, or the like, depending on a type of the network device Ri. The virtualized operating system may support Docker containers and/or virtual machines, for example. On network device R1, kernel 206 hosts a local instance 404 (i.e., a production instance) of a control plane and a data plane (i.e., control and data planes) of network device R1. Local instance 404 is considered "local" because it resides/is hosted on network device R1. By way of example, the control and data planes include instances of the BGP and the OSPF protocol, and instances of an RIB and possibly an FIB (not shown) associated with the protocols. The data plane also includes interface configuration information for interfaces of the network device R1.

To implement the in-band option on network device R1, kernel 206 also hosts a local twin 410 that includes a virtual control plane, a virtual data plane (i.e., virtual control and data planes), and virtual interfaces. The virtual interfaces are shown in FIG. 5, described below. The local twin 410 may be implemented in/as a virtual machine or a container hosted directly on kernel 206 separately from processes that execute in local instance 404, for example. The local twin 410 virtually replicates local instance 404, but is operationally decoupled form the local instance. The virtual control and data planes of local twin 410 include virtual instances of the BGP and the OSPF protocol, and virtual instances of an RIB and possibly an FIB associated with the virtual protocols, which replicate the corresponding components or peers on local instance 404. The virtual control and data planes also include virtual interface configuration information for the virtual interfaces of local twin 410.

More generally, local twin 410 represents a virtual replica network device (e.g., VRi) hosted on network device R1 that virtually replicates the network device with respect to production network functions performed by the network device (e.g., by local instance 404), such as preparing to forward production traffic and then forwarding that traffic. While hosting of/instantiating local twin 410 on network device R1 relies on or uses physical resources of the network device, such as physical compute (e.g., CPU), storage (e.g., memory), and network (e.g., interface/port) resources, the local twin performs virtualized network operations separately and independently from the production network operations performed by local instance 404.

To this end, under control of network controller 110, NIFP 130 on network device R1 can be commanded to inject virtual failures and/or virtual traffic into local twin 410. The injected failures and/or virtual traffic propagate through local twin independently of, and on a non-interfering basis with respect to, the production network operations performed by network device R1, including routing, traffic forwarding, and so on. The NIFP 130 reports, to network controller, 110, results of injecting the failures and/or forwarding the virtual traffic.

To further implement the in-band option, network device R2 is configured similarly to network device R1 to host, on network device R2, a local twin 420 that serves as a virtual replica network device that virtually replicates network device R2. More specifically, kernel 206 of network device R2 hosts a local instance 414 having control and data planes similar to those of local instance 404 on network device R1. Also, kernel 206 of network device R2 hosts local twin 420 to include virtual control and data planes, similar to those of local twin 410 hosted on network device R1, that virtually replicate local instance 414. The virtual data plane of local twin 420 also includes virtual interface configuration information for virtual interfaces of the local twin that replicate interfaces of network device R2. Network controller 110 employs NIFP 130 on network device R2 to inject failures and/or virtual traffic into local twin 420, which propagate through the local twin independently of network-related operations performed by network device R2. More specifically, network controller 110 sends commands to NIFP 130, which trigger the NIFP to inject the failures.

Figure 5:
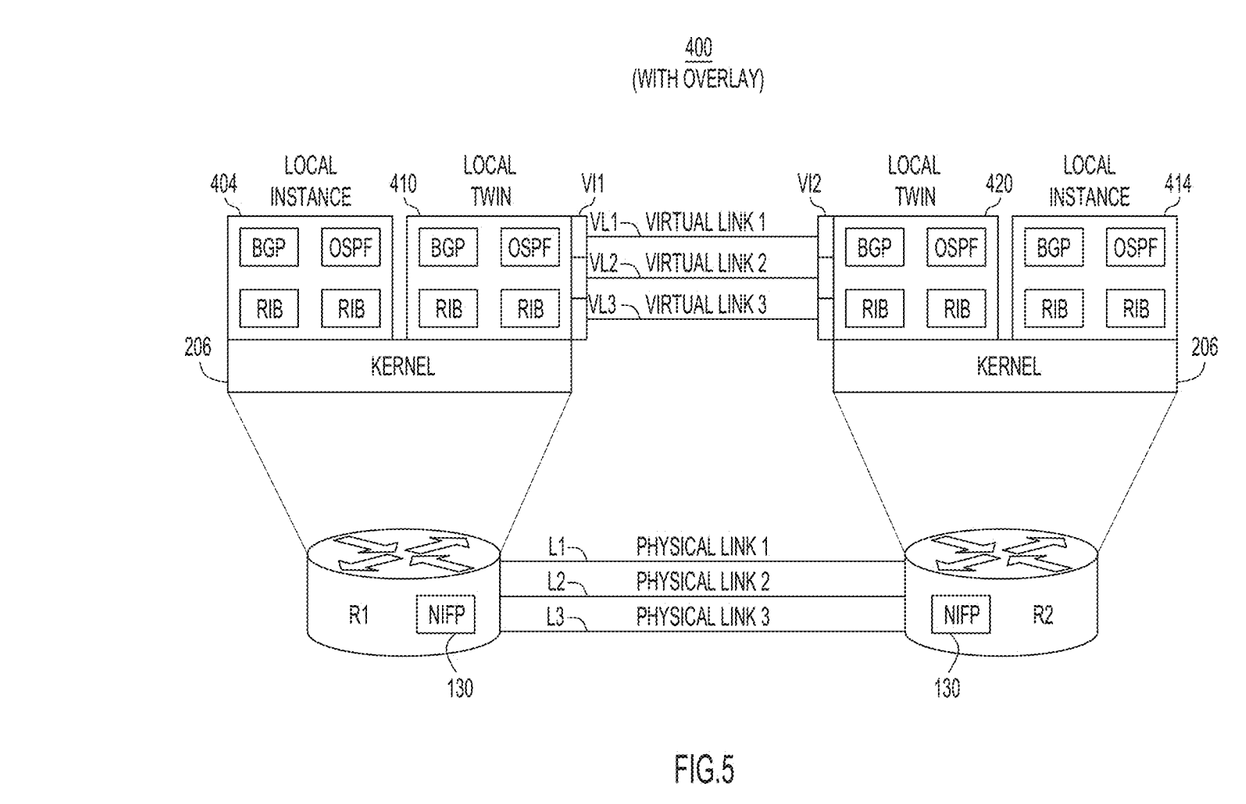
FIG. 5 is an illustration of the in-band option that shows virtual connections between the local twins to form a virtual replica network or overlay that virtually replicates a portion of the network, according to an example embodiment.

FIG. 5 is an illustration of in-band option 400 that shows virtual connections between local twin 410 and local twin 420 to form a virtual replica network that replicates a portion of the topology of network 120. That is, the virtual replica network shown in FIG. 4 has a virtual topology that replicates the topology of network 120 (at least between network devices R1 and R2). The example of FIG. 5 assumes that, in network 120, network device R1 includes 3 physical interfaces connected to 3 physical interfaces of network device R2 over 3 physical links L1, L2, L3. The in-band option replicates this topology virtually under control of network controller 110 in the following manner. Local twin 410 includes 3 virtual interfaces VI1 connected to 3 virtual interfaces VI2 of local twin 420 (which is referred to as the "remote local twin") over 3 virtual links VL1, VL2, and VL2 that virtually replicate physical links L1, L2, and L3, respectively. The virtual links may be implemented as logical links on the physical links.

The virtual replica network shown in FIG. 5 represents a virtual replica network overlay that resides on and virtually replicates the topology of the underlying network (e.g., network 120). Under control of network controller 110 and NIFPs 130 of network devices R1 and R2, virtual traffic that is forwarded by local twin 410 to (remote) local twin 420 over virtual links VL1-VL3 may replicate traffic forwarded by network device R1 to network device R2 over physical links L1-L3; however, the virtual traffic is forwarded over the virtual links independently of and without interfering with the traffic forwarded over the physical links. Thus, NIFPs 130 may inject virtual traffic into the virtual network for test purposes without interfering with the underlying network.

The in-band option may use different mechanisms to create the local twin(s) and the above-described virtual replica network/overlay of network 120. In a first method, network controller 110 installs NIFPs 130 and the virtualized operating system on each of network devices 122. Based on a test scenario to be run, network controller 110 identifies a portion of network 120 (i.e., the network topology) to be replicated, including relevant network devices in that portion of the network. Network controller 110 instructs the relevant network devices to replicate themselves. In response, each relevant network device instantiates a local twin (on that network device), and connects its local twin to any remote local twins to replicate the topology, as described above.

Each relevant network device may implement its local twin in a container or as a virtual machine, which may implement a virtual control plane, a virtual data plane, and virtual interfaces. In addition, the local NIFP 130 may capture configuration information from a local control plane, a local data plane, and from local interfaces, and transfer the configuration information to the virtual control plane, virtual data plane, and virtual interfaces.

The in-band option includes security measures to secure or protect communication between network controller 110 and network devices 122, and to secure content on and operations performed by the network devices. Network controller 110 may limit the resources (e.g., compute, storage, and/or network resources) used by a local twin (e.g., local twin 410) on the network device, so as to minimize the impact of the local twin on the local instance (e.g., local instance 404). Network controller 110 may apply safety bounds to the local twin, with the ability to apply extremely tight boundaries. These boundaries restrict the impact (or a percentage of resources, as per selection by an operator) of the local twin on the local instance. For example, the operator may create a test scenario in which the local twin forwards virtual traffic (also referred to as synthetic or test traffic). The operator applies a lower priority to the virtual traffic compared to the (operational) traffic so that the traffic takes precedent over the virtual traffic.

Figure 6:
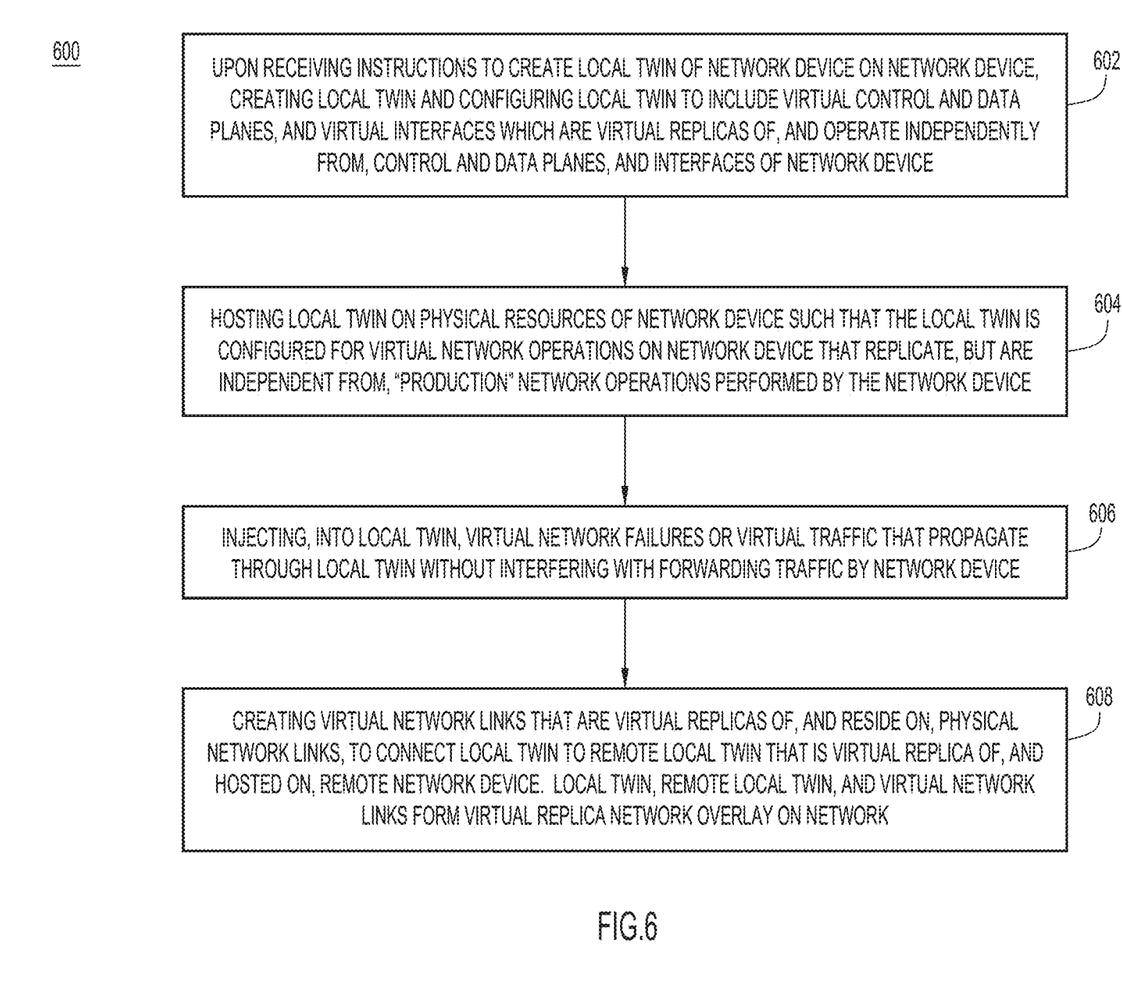
FIG. 6 is a flowchart of a method for the in-inband option that creates a local twin on a network device, according to an example embodiment.

FIG. 6 is a flowchart of an example method 600 of an in-band option that includes creating, on a network device among network devices of a network that are controlled by a network controller, a local twin of the network device that replicates the network device and that is used for test purposes. The network device includes/has a control plane, a data plane (i.e., control and data planes), and interfaces configured for network operations in the network. The network operations may include routing and traffic forwarding, for example. The network device may be considered a production network device deployed in a production network, which includes many production network devices. The network operations may be considered production network operations that are not test network operations.

At 602, the network controller sends, to the network device over the network, instructions to instantiate/create a local twin of the network device. Upon receiving the instructions, the network device creates the local twin as a virtual replica of the network device (e.g., of a local production instance of the control plane, the data plane, and the interfaces) that is configured for test purposes. To do this, the network device configures the local twin to include a virtual control plane, a virtual data plane (i.e., virtual control and data planes), and virtual interfaces, which are virtual replicas of, and operate independently from, the control and data planes, and the interfaces of the network device, respectively. The virtual control and data planes may be configured to replicate routing protocols and one or more of a routing information base and a forwarding information base used by the control and data planes of the network device. The virtual interfaces may be configured to replicate the interfaces of the network device.

At 604, the network device hosts the local twin on physical resources (e.g., using compute, storage, and network resources) of the network device, such that the local twin is configured for virtual network operations that replicate, but are independent from, the (production) network operations. For example, processes used to instantiate the local twin may be executed as a container or as a virtual machine on the network device separately from processes used by the network device to implement its production control and data planes, and the interfaces of the network device.

In addition, the network controller may perform placing constraints on the physical resources of the network device that are to be used to host the local twin, so that the network device hosts the local twin within the constraints to minimize an impact of the local twin on performance of the network operations. To do this, the network device may send, to the network device, a command that includes the constraints (e.g., CPU and/or storage limits). Once the network device instantiates the local twin, the network device monitors usage of the physical resources by the local twin, and limits such usage to the constraints.

At 606, the network device employs a probe process (e.g., NIFP) configured to inject, into the local twin, virtual network failures or virtual traffic that propagate through the local twin without interfering with control plane, data plane, and interface operations (such as traffic forwarding) performed by the network device.

In an example in which the network includes physical links/connections to connect the network device to a remote network device, at 608, the network device creates virtual links that are virtual replicas of, and reside on, the physical links, to connect the local twin to a remote local twin that is a virtual replica of, and hosted on, the remote network device. The local twin, the remote local twin, and the virtual links collectively form a virtual replica network overlay that resides on, replicates a topology of, and operates independently from the network. That is, the virtual replica network overlay performs virtual network operations that are independent of network operations performed by the "underlying" network. The network device may employ the probe process to implement a test scenario that includes forwarding virtual traffic from the virtual interfaces (over the virtual links), and may also assign a higher priority to traffic forwarding from the interfaces than to virtual traffic forwarding from the virtual interfaces.

In another embodiment, a network controller of production network devices configured to implement a production network topology of a production network for routing and forwarding production traffic performs a method. The method comprises: providing first instructions to the production network devices to cause the production network devices collectively to form a virtual replica network overlay that replicates the production network topology, resides on the production network, and operates independently of the production network, wherein the first instructions cause the production network devices to perform, respectively: creating virtual network devices (i.e., local twins) that virtual replicate the production network devices; hosting the local twins devices on the network devices; and providing second instructions to the production network devices (e.g., to embedded probe process) to cause the production network devices to inject, into the virtual replica network overlay, virtual failures or virtual traffic that propagate through the virtual replica network overlay independently of forwarding the production traffic.

Figure 7:
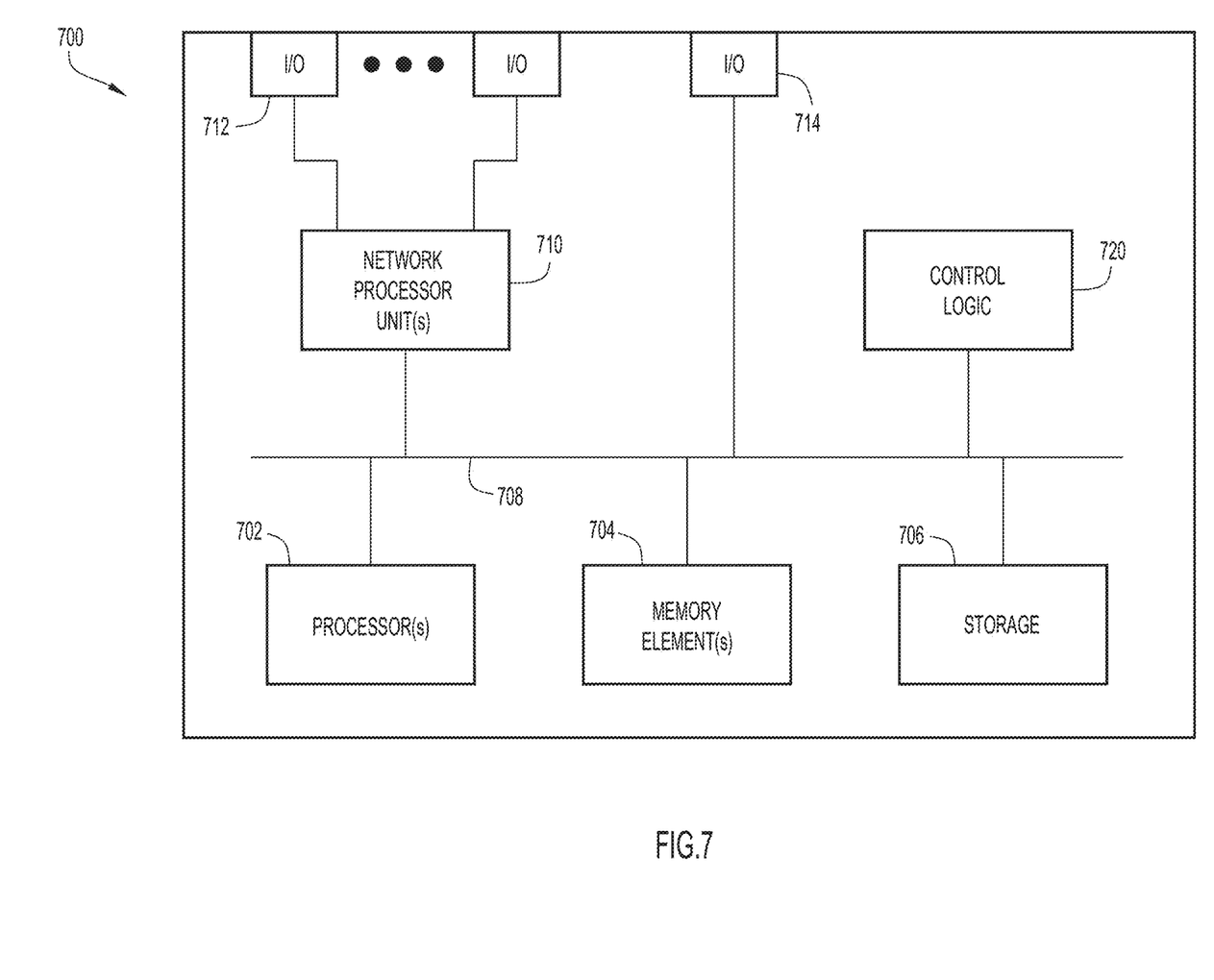
FIG. 7 is a hardware block diagram of a computing device that may be configured to perform the functions of a controller and/or a network device as presented herein, according to an example embodiment.

Referring to FIG. 7, FIG. 7 illustrates a hardware block diagram of a computing/computer device 700 or in general any apparatus that may perform functions of the network controller 110, each of network devices 122, and protocol simulator 204 described herein in connection with FIGS. 1-6. Moreover, the hardware block diagram in FIG. 7 may also be generally representative of an apparatus, such as network device that is controlled, according to the techniques presented herein, to create a local twin on the network device, and then to induce a failure into the local twin, and into a virtual replica network overlay to which the local twin is connected.

In at least one embodiment, the computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at a network device configured to be connected to a network and having control and data planes, and interfaces configured for network operations in the network: upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

In some aspects, the techniques described herein relate to a method, further including, at the network device: injecting, into the local twin, virtual network failures or virtual traffic that propagate through the local twin without interfering with traffic forwarding by the network device.

In some aspects, the techniques described herein relate to a method, further including: hosting, on the network device, a probe process configured to, under control of the controller, trigger injecting the virtual network failures or the virtual traffic into the local twin.

In some aspects, the techniques described herein relate to a method, wherein the network includes physical links to connect the network device to a remote network device in the network, and the method further includes: creating virtual links that are virtual replicas of, and reside on, the physical links, to connect the local twin to a remote local twin that is a virtual replica of, and hosted on, the remote network device.

In some aspects, the techniques described herein relate to a method, wherein the local twin, the remote local twin, and the virtual links collectively form a virtual replica network overlay that resides on, replicates a topology of, and operates independently from, the network.

In some aspects, the techniques described herein relate to a method, further including: hosting a virtualized operating system on the network device, wherein hosting includes hosting the local twin on the virtualized operating system.

In some aspects, the techniques described herein relate to a method, wherein: configuring includes configuring the virtual control and data planes to replicate routing protocols and one or more of a routing information base (RIB) and a forwarding information base (FIB) of the control and data planes of the network device.

In some aspects, the techniques described herein relate to a method, further including: implementing a test scenario that includes forwarding virtual traffic from the virtual interfaces; and assigning a higher priority to forwarding traffic from the interfaces than to forwarding the virtual traffic from the virtual interfaces.

In some aspects, the techniques described herein relate to a method, further including: placing constraints on the physical resources of the network device that are to be used to host the local twin, wherein hosting includes hosting the local twin within the constraints to minimize an impact of the local twin on performance of the network operations.

In some aspects, the techniques described herein relate to a method, wherein the network operations include routing and forwarding traffic, and the virtual network operations include virtual routing and forwarding virtual traffic.

In some aspects, the techniques described herein relate to an apparatus including: a network input/output interface to communicate with a network; and a processor of a network device having control and data planes, and interfaces configured for network operations in the network, the processor coupled to the network input/output interface and configured to perform: upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

In some aspects, the techniques described herein relate to an apparatus, wherein the processor is further configured to perform: injecting, into the local twin, virtual network failures or virtual traffic that propagate through the local twin without interfering with traffic forwarding by the network device.

In some aspects, the techniques described herein relate to an apparatus, wherein the processor is further configured perform: hosting, on the network device, a probe process configured to, under control of the controller, trigger injecting the virtual network failures or the virtual traffic into the local twin.

In some aspects, the techniques described herein relate to an apparatus, wherein the network includes physical links to connect the network device to a remote network device in the network, and the processor is further configured to perform: creating virtual links that are virtual replicas of, and reside on, the physical links, to connect the local twin to a remote local twin that is a virtual replica of, and hosted on, the remote network device.

In some aspects, the techniques described herein relate to an apparatus, wherein the local twin, the remote local twin, and the virtual links collectively form a virtual replica network overlay that resides on, replicates a topology of, and operates independently from, the network.

In some aspects, the techniques described herein relate to an apparatus, wherein the processor is further configured to perform: hosting a virtualized operating system on the network device by hosting the local twin on the virtualized operating system.

In some aspects, the techniques described herein relate to an apparatus, wherein: the processor is configured to perform configuring by configuring the virtual control and data planes to replicate routing protocols and one or more of a routing information base (RIB) and a forwarding information base (FIB) of the control and data planes of the network device.

In some aspects, the techniques described herein relate to a non-transitory computer medium encoded with instructions that, when executed by a processor of a network device configured to be connected to a network and having control and data planes, and interfaces configured for network operations in the network, cause the processor to perform: upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

In some aspects, the techniques described herein relate to a non-transitory computer medium, further including instructions to cause the processor to perform: injecting, into the local twin, virtual network failures or virtual traffic that propagate through the local twin without interfering with traffic forwarding by the network device.

In some aspects, the techniques described herein relate to a non-transitory computer medium, further including instructions to cause the processor to perform: hosting, on the network device, a probe process configured to, under control of the controller, trigger injecting the virtual network failures or the virtual traffic into the local twin.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a network device configured to be connected to a network and having control and data planes, and interfaces configured for network operations in the network:
upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and hosting the local twin on physical resources of the network device such that the local twin is configured for virtual network operations on the network device that replicate, but are independent from, the network operations.

2. The method of claim 1, further comprising, at the network device:
injecting, into the local twin, virtual network failures or virtual traffic that propagate through the local twin without interfering with traffic forwarding by the network device.

3. The method of claim 2, further comprising:
hosting, on the network device, a probe process configured to, under control of the controller, trigger injecting the virtual network failures or the virtual traffic into the local twin.

4. The method of claim 1, wherein the network includes physical links to connect the network device to a remote network device in the network, and the method further comprises:
creating virtual links that are virtual replicas of, and reside on, the physical links, to connect the local twin to a remote local twin that is a virtual replica of, and hosted on, the remote network device.

5. The method of claim 4, wherein the local twin, the remote local twin, and the virtual links collectively form a virtual replica network overlay that resides on, replicates a topology of, and operates independently from, the network.

6. The method of claim 1, further comprising:
hosting a virtualized operating system on the network device,
wherein hosting includes hosting the local twin on the virtualized operating system.

7. The method of claim 1, wherein:
configuring includes configuring the virtual control and data planes to replicate routing protocols and one or more of a routing information base (RIB) and a forwarding information base (FIB) of the control and data planes of the network device.

8. The method of claim 1, further comprising:
implementing a test scenario that includes forwarding virtual traffic from the virtual interfaces; and
assigning a higher priority to forwarding traffic from the interfaces than to forwarding the virtual traffic from the virtual interfaces.

9. The method of claim 1, further comprising:
placing constraints on the physical resources of the network device that are to be used to host the local twin,
wherein hosting includes hosting the local twin within the constraints to minimize an impact of the local twin on performance of the network operations.

10. The method of claim 1, wherein the network operations include routing and forwarding traffic, and the virtual network operations include virtual routing and forwarding virtual traffic.

11. An apparatus comprising:
a network input/output interface to communicate with a network; and
a processor of a network device having control and data planes, and interfaces configured for network operations in the network, the processor coupled to the network input/output interface and configured to perform:
upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and
hosting the local twin on physical resources of the network device such that the local twin is configured for virtual network operations on the network device that replicate, but are independent from, the network operations.

12. The apparatus of claim 11, wherein the processor is further configured to perform:
injecting, into the local twin, virtual network failures or virtual traffic that propagate through the local twin without interfering with traffic forwarding by the network device.

13. The apparatus of claim 12, wherein the processor is further configured perform:
hosting, on the network device, a probe process configured to, under control of the controller, trigger injecting the virtual network failures or the virtual traffic into the local twin.

14. The apparatus of claim 11, wherein the network includes physical links to connect the network device to a remote network device in the network, and the processor is further configured to perform:
creating virtual links that are virtual replicas of, and reside on, the physical links, to connect the local twin to a remote local twin that is a virtual replica of, and hosted on, the remote network device.

15. The apparatus of claim 14, wherein the local twin, the remote local twin, and the virtual links collectively form a virtual replica network overlay that resides on, replicates a topology of, and operates independently from, the network.

16. The apparatus of claim 11, wherein the processor is further configured to perform:
hosting a virtualized operating system on the network device by hosting the local twin on the virtualized operating system.

17. The apparatus of claim 11, wherein:
the processor is configured to perform configuring by configuring the virtual control and data planes to replicate routing protocols and one or more of a routing information base (RIB) and a forwarding information base (FIB) of the control and data planes of the network device.

18. A non-transitory computer medium encoded with instructions that, when executed by a processor of a network device configured to be connected to a network and having control and data planes, and interfaces configured for network operations in the network, cause the processor to perform:
upon receiving, from a controller, instructions to form a local twin of the network device that is a virtual replica of the network device to be used for test purposes, creating the local twin and configuring the local twin to include virtual control and data planes, and virtual interfaces, which are virtual replicas of, and operate independently from, the control and data planes, and the interfaces, of the network device, respectively; and
hosting the local twin on physical resources of the network device such that the local twin is configured for virtual network operations on the network device that replicate, but are independent from, the network operations.

19. The non-transitory computer medium of claim 18, further comprising instructions to cause the processor to perform:
- injecting, into the local twin, virtual network failures or virtual traffic that propagate through the local twin without interfering with traffic forwarding by the network device.

20. The non-transitory computer medium of claim 19, further comprising instructions to cause the processor to perform:
- hosting, on the network device, a probe process configured to, under control of the controller, trigger injecting the virtual network failures or the virtual traffic into the local twin.

* * * * *